July 3, 1956     R. W. KINDLE ET AL     2,752,978
TUBELESS PNEUMATIC TIRE AND METHOD OF MAKING SAME
Filed Oct. 23, 1953
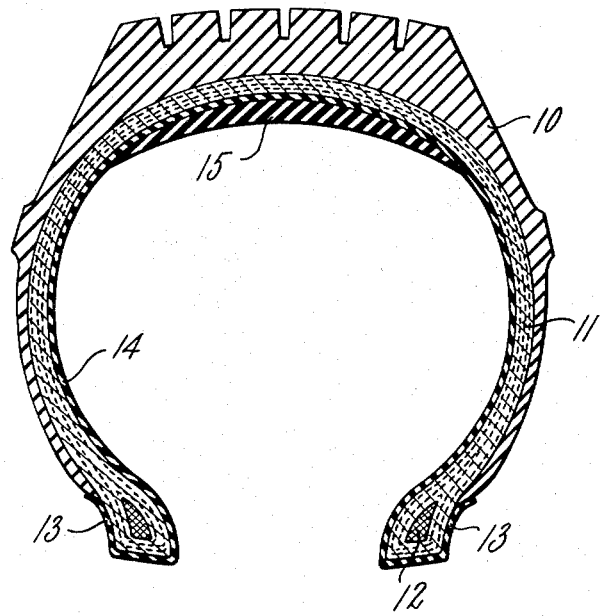
LINER MADE OF BLEND OF
BUTYL RUBBER CHEMICALLY
MODIFIED BY PARAQUINONE
DIOXIME WITH
ANOTHER RUBBER
INVENTORS
ROBERT W. KINDLE
JOHN J. FLEMING
BY James J. Long
AGENT

United States Patent Office 2,752,978
Patented July 3, 1956

2,752,978

TUBELESS PNEUMATIC TIRE AND METHOD OF MAKING SAME

Robert W. Kindle, Detroit, and John J. Fleming, Grosse Pointe Woods, Mich., assignors to United States Rubber Company, New York, N. Y., a corporation of New Jersey Application October 23, 1953, Serial No. 387,952

7 Claims. (Cl. 152—330)

This invention relates to an improved pneumatic tire, and more particularly it relates to a pneumatic tire of the tubeless type embodying an air-retaining envelope comprised of a mixture of natural rubber or butadiene-styrene synthetic rubber and Butyl rubber that has been chemically modified by reaction with paraquinone dioxime, as well as to a method of making such improved tire.

Pneumatic tires of the tubeless type conventionally include an inner layer or liner of air-retaining material adhered to the band ply of the tire casing, and serving as an impermeable envelope for the air within the tire, in place of the usual inner tube. The composition and manufacture of such a lining material for tubeless tires has up to the present time presented a serious difficulty in the manufacture of satisfactory tubeless tires, because the materials proposed for this purpose have all had certain shortcomings, either from the standpoint of preparation or performance, or both. This situation arises because there are a number of exacting requirements that must be met in a practical tubeless tire liner, and those skilled in this art have not up to the present time been able to work out an entirely satisfactory process and composition. No obvious solution to the problem has been forthcoming because the lining material, besides being sufficiently impermeable to air to permit the tire to be used for reasonable periods without requiring re-inflation, must also have sufficient adhesiveness to remain securely united to the inner surface of the tire casing, which is usually made of a composition based mainly on natural rubber or such synthetic rubbers as GR–S. At the same time, it is essential that the liner have good physical properties, so that it does not heat up or deteriorate in use and so that it does not tend to develop cracks under the influence of the repeated severe flexing that it is subjected to in use. In addition, the liner must have good building tack and form secure splices.

The requirement that the liner stock shall not crack in use has been particularly difficult to fulfill satisfactorily, and as a result many premature failures have been noted in conventional tubeless tires consequent to the fact that air under pressure passes through such cracks from the interior of the tire into the interstices of the carcass plies, where it expands under the influence of the elevated temperatures developed in use, thereby causing separation and failure of the reinforcing plies. This type of failure commonly manifests itself as a "blowout" that occurs suddenly and without warning, to the peril of the occupants of the vehicle on which the tire is used.

Accordingly, the principal object of the present invention is to provide a pneumatic tire embodying a liner material that obviates the difficulties experienced with prior art tubeless tires.

Another object of the invention is the provision of a method of making a tubeless tire liner material that can be carried out efficiently and economically in the plant.

The manner in which the invention accomplishes the foregoing objects, as well as additional objects and advantages, will be made manifest in the following detailed description, which is intended to be read with reference to the accompanying drawing, the single figure of which represents in transverse cross section a typical tubeless tire made in accordance with the invention.

The invention contemplates provision of a liner composition for tubeless tires based on the Butyl type of synthetic rubber, that is, a low temperature rubbery copolymerizate of an isoolefin such as isobutylene with a conjugated diolefin such as isoprene or butadiene. Such synthetic elastomers are made by well known methods, usually from isoolefins having from 4 to 6 carbon atoms and conjugated diolefins having from 4 to 8 carbon atoms, the proportion of combined diolefin in the copolymer usually being within the range of from 0.5 to 10%, and more preferably from 0.5 to 5%. Butyl rubber has the advantage of providing the desired good air retention, but it cannot be used of itself as a practical liner material because it is not compatible with natural rubber or the synthetic type rubbers used in tire carcasses, and therefore an all-Butyl liner stock has very poor adhesion to the tire carcass stock, or even to the tire fabrics treated with the usual adhesives, that are commonly based on natural or synthetic rubber latex containing a small amount of phenol-aldehyde resin.

If it is attempted to render the Butyl rubber adhesive to the tire carcass by incorporating natural rubber or such synthetic rubbers as GR–S (butadiene-styrene copolymer) with the Butyl, the results are entirely unsatisfactory because of the non-homogeneous nature of such a mixture. The incompatibility between the Butyl rubber and the other rubber manifests itself in extremely poor physical properties, so that such a mixture has no utility. Such blends cannot be successfully vulcanized because the natural rubber or GR–S rubber in the blend combines with the available curatives in the mixture.

The present invention is based upon the unexpected discovery that if the Butyl rubber is first modified by reacting it, under critical conditions, with critical, small amounts of paraquinone dioxime, the Butyl rubber is converted into a condition in which it is apparently readily compatible with natural rubber or GR–S, yielding a blend that is capable of developing good physical properties upon vulcanization, and that adheres unusually well to the usual tire carcass materials. The desired modification of the Butyl rubber with paraquinone dioxime is facilitated by the presence of a small amount of an oxidizing agent, such as red lead.

In carrying out the invention, the Butyl rubber is masticated at an elevated temperature in the presence of from 0.1 to 1.5 parts of paraquinone dioxime, per 100 parts of the Butyl rubber. Preferably, the amount of paraquinone dioxime employed is from 0.15 to 0.6 part, per 100 parts of the Butyl rubber. Such mastication is preferably carried out in the presence of carbon black, and we preferably employ from about 25 to 75 parts of carbon black to 100 parts of Butyl rubber at this stage. Generally, we mix the carbon black thoroughly with the rubber before we add the paraquinone dioxime, for the purpose of effecting the required chemical modification. With the foregoing amounts of chemical modifying agent, the desired chemical modification proceeds to the required critical extent when the mixture is masticated for a time ranging from 3 minutes at 400° F. to 60 minutes at 300° F., and preferably for 10 to 20 minutes at 350–375° F. It is a characteristic of this treatment that the chemical action of the paraquinone dioxime on the Butyl rubber is substantially exhausted. The thus-modified Butyl is in no sense a cured or vulcanized material, and it is readily processable, and it is still definitely an unsaturated material susceptible of vulcanization or cure by the action of suitable added curatives.

The modifying reaction of the paraquinone dioxime on the Butyl rubber may be promoted, as indicated previously, by the presence of oxidizing agents, suitably in amount of from about 0.1 to 1.0 part. Red lead oxide is particularly suitable for this purpose.

After the modifying step, the batch is usually discharged on a mill and sheeted out. The mix gives a smooth sheet on the mill and can be handled in the same way as a Butyl-carbon black master batch of this type. No further processing or treatment of the Butyl rubber is necessary.

The next essential step in the method of the invention is to mix the thus-modified Butyl rubber with another type of rubber, preferably corresponding to the kind of rubber predominating in the tire carcass stock, which is usually either natural rubber or GR-S rubber, the natural rubber being preferred. The desired physical properties are provided by mixing from 45% to 75% of the Butyl rubber hydrocarbon with correspondingly from 55% to 25% of the other rubber. At this stage, there is preferably mixed in additional carbon black, usually amounting to from 25 to 75 parts, per 100 parts of the other rubber. The usual processing aids and conventional vulcanizing ingredients are also added to the mix at this point. Although it is preferable that the rubber that is mixed with the chemically modified Butyl be the same rubber as that of the carcass stock, satisfactory results are also obtainable if these rubbers are not the same. For example, a chemically modified Butyl may be mixed with GR-S in the liner, for application to a carcass of natural rubber, or natural rubber may be mixed in the liner to be applied to a GR-S carcass.

Upon vulcanization of a completed stock of this kind, it is surprisingly found that the physical properties of the vulcanizate far exceed those of the Butyl rubber compositions that have heretofore been proposed for use as tubeless tire liners. At the same time, the air retention properties of the stock are excellent and the adhesion of this type of liner compound to carcass stocks and adhesive treated fabrics is superior to the usual Butyl compositions.

The following example will serve to illustrate various aspects of the invention in more detail. In the example all parts are expressed by weight.

EXAMPLE

Referring to the drawing, the invention was employed to make a tubeless tire including the usual outer rubber covering 10 constituting the tread and sidewall, beneath which there was disposed the usual carcass 11 composed of a plurality of plies of adhesive-treated cord fabric skim coated with conventional carcass stock based on natural rubber. The tire included the usual inextensible bead elements 12 in the ends of the carcass, and the under and outer portions of the bead area were provided with a suitable rim sealing arrangement 13. The liner composition was applied to the interior surface or band ply surface of the carcass in the form of a sheet 14 extending from one bead area to the other, in adhesive contact with the carcass stock, or, if there is no covering of carcass stock on the interior band ply surface, then the liner is in adhesive contact with the cords themselves, bearing the latex-resin adhesive material. The interior crown surface of the liner preferably has applied thereover a layer 15 of puncture-sealing material, that is capable of sealing any holes accidentally made in the tire by puncturing objects such as nails. The method of assembling the foregoing parts in their proper relation and vulcanizing the assembly in the desired shape in a mold is well understood by those skilled in this art, and requires no detailed description here.

The liner 14 of the invention was made by first compounding the following modified Butyl master batches:

*Modified Butyl master batches*

|  | A | B |
| --- | --- | --- |
| GR-I 25 | 100.00 | 100.00 |
| HMF Black | 35.00 |  |
| MPC Black |  | 50.00 |
| Stearic Acid |  | 1.00 |
| GMF | 0.35 | 0.35 |

The GMF was a trade preparation comprising paraquinone dioxime. The GR-I 25 was a commercially available type of Butyl rubber and it was first mixed with the carbon black in a Banbury, after which the GMF was added and the mixing was continued for 15 minutes at a temperature ranging from 350° F. to 375° F. The batch was discharged on a mill and sheeted out to give a smooth sheet.

The following final compounds were then prepared, employing the foregoing modified Butyl master batches:

*Final compounds*

|  | A | B |
| --- | --- | --- |
| Modified Butyl Master-batch | 135.35 | 151.35 |
| No. 4 Smoked Sheet | 100.00 | 100.00 |
| SRF Carbon Black | 35.0 | 35.0 |
| Stearic Acid | 2.5 | 2.5 |
| Hydrocarbon Oil | 10.0 | 10.0 |
| Zinc Oxide | 7.5 | 7.5 |
| MBTS (Benzothiazyldisulfide) | 1.0 | 1.0 |
| Monex (Tetramethyl-thiuram mono-sulfide) | 0.25 | 0.25 |
| Sulfur | 2.00 | 2.00 |

The compounds were mixed with the aid of a Banbury mixer and a roll mill in accordance with the usual practice. It will be understood that the essential feature of these mixes is in the combination of the modified Butyl rubber with the other rubber, in this case natural rubber in the form of smoked sheets, and the remaining ingredients of the mixes may be varied at will in accordance with conventional practice to provide a vulcanizable mix that is capable of being cured in the course of the customary tire molding step, as will be apparent to those skilled in the art of rubber compounding. In each case the mix was formed into a sheet by calendering, and the liner 14 was applied to the interior of the raw tire carcass before shaping the same. It was observed that the liner had unusually good tack, and could be handled and applied to the tire carcass with ease. The sheet spliced satisfactorily, and adhered well to itself as well as to the carcass. Thereafter, the assembly was shaped and vulcanized in the usual manner. In the course of the vulcanization, the liner became permanently adhered to the carcass, without the aid of any previous special adhesive treatment or cement.

Samples of the liner compounds of the invention after curing in a press for the times shown below at 45 pounds steam pressure have the following properties:

| Properties | Cure Minutes at 45 Lbs. | A | B |
| --- | --- | --- | --- |
| Tensile Strength, p. s. i. | 30 | 950 | 800 |
|  | 45 | 900 | 780 |
| Modulus at 300% elongation, p. s. i. | 30 | 200 | 200 |
|  | 45 | 330 | 260 |
| Elongation at break, percent | 30 | 600 | 610 |
|  | 45 | 570 | 570 |
| Torsional hysteresis at 285° F | 30 | .167 | .195 |
|  | 45 | .163 | .191 |

In contrast to these physical properties, a similar mixture employing Butyl rubber reclaim in place of the chemically modified Butyl rubber employed in the composition of the invention had the following physical properties:

Tensile, p. s. i. _____ 580
Elongation at break, percent_____ 590
Modulus at 300% elongation, p. s. i._____ 215

The superiority of the liners of the invention will be apparent from a comparison of the foregoing sets of physical properties.

In order to further demonstrate the superiority of the liner of the present invention, a number of tires can be made up with liners similar to that described in the foregoing working examples. The tires can be mounted and inflated to a definite standard pressure and subjected to a standard load, while running against a cleated test wheel at a definite speed. Under the conditions of the test, the tires made in acordance with the invention can run without failure for much longer times than tubeless tires with liners made of a similar composition, but based on Butyl inner tube reclaim, instead of on chemically modified Butyl rubber in accordance with the invention. Our invention has therefore definitely improved the quality of the tire. In addition to the improved life, the tires embodying the liner of the invention have very little cracking in the liner stock as compared to the liner based on reclaim Butyl, which are exceptionally badly cracked.

The improvement realized with the liner composition of the invention is believed to be due at least in part to the fact that the chemical treatment of the Butyl rubber under the critical conditions employed in the invention does not result in any powerful residual accelerating or curing material being present in the Butyl. In any event, Butyl reclaim, or any Butyl rubber that has first been substantially cured with the usual vulcanizing agents and accelerators, and thereafter refined to approximate a reclaim, is not capable of providing a liner composition that at once has good splicing qualities and does not crack in use, while being singularly immune to progressive deterioration and undesirable change in physical properties, as the liner compositions made in accordance with the invention are.

Having thus described our invention, what we claim and desire to protect by Letters Patent is:

1. A vulcanized pneumatic tire of the tubeless type comprising in combination an outer rubber covering, an underlying reinforcing carcass of cord fabric coated with a rubber selected from the group consisting of natural rubber and butadiene-styrene copolymer, and a liner vulcanized to the interior surface of said carcass, said liner covering the entire interior surface of said carcass from one bead area of the tire to the other, and said liner comprising a blend of (A) from 45 to 75% by weight of an initially essentially unvulcanized, processible, unsaturated, sheet-forming reaction product of (1) from 0.1 to 1.5 parts of paraquinone dioxime and (2) 100 parts of a rubbery copolymer of an isoolefin having from 4 to 6 carbon atoms, with from 0.5 to 10% of a conjugated diolefin having from 4 to 8 carbon atoms, and (B) correspondingly from 55 to 25% of a rubber selected from the group consisting of natural rubber and butadiene-styrene copolymer rubber, the said blend being vulcanized in the final assembly.

2. A vulcanized pneumatic tire of the tubeless type comprising in combination an outer rubber covering, an underlying reinforcing carcass of cord fabric coated with a rubber selected from the group consisting of natural rubber and butadiene-styrene copolymer, and a liner vulcanized to the interior surface of said carcass, said liner covering the entire interior surface of said carcass from one bead area of the tire to the other, and said liner comprising a blend of (A) from 45 to 75% by weight of an initially essentially unvulcanized, processible, unsaturated, sheet-forming reaction product of (1) from 0.15 to 0.6 part of paraquinone dioxime and (2) 100 parts of a rubbery copolymer of an isoolefin having from 4 to 6 carbon atoms, with from 0.5 to 5% of a conjugated diolefin having from 4 to 8 carbon atoms, and (B) correspondingly from 55 to 25% of a rubber selected from the group consisting of natural rubber and butadiene-styrene copolymer rubber, the said blend being vulcanized in the final assembly.

3. A vulcanized pneumatic tire of the tubeless type comprising in combination an outer rubber covering, an underlying reinforcing carcass of cord fabric coated with natural rubber, and a liner vulcanized to the interior surface of said carcass, said liner covering the entire interior surface of said carcass from one bead area of the tire to the other, and said liner comprising a blend of (A) from 45 to 75% by weight of an initially essentially unvulcanized, processible, unsaturated, sheet-forming reaction product of (1) from 0.15 to 0.6 part of paraquinone dioxime and (2) 100 parts of a rubbery copolymer of isobutylene with from 0.5 to 5% of isoprene, and (B) correspondingly from 55 to 25% of natural rubber, the said blend being vulcanized in the final assembly.

4. A method of making a tubeless tire comprising in combination the steps of chemically modifying a rubbery copolymer of an isoolefin having from 4 to 6 carbon atoms with from 0.5 to 10% of a conjugated diolefin having from 4 to 8 carbon atoms by masticating 100 parts of said rubbery copolymer with from 0.1 to 1.5 parts of paraquinone dioxime for from 3 minutes at 400° F. to 60 minutes at 300° F., to provide an essentially unvulcanized, processible, unsaturated, sheet-forming reaction product, mixing from 45 to 75% by weight of the thus-modified copolymer with correspondingly from 55 to 25% of a rubber selected from the group consisting of natural rubber and butadiene-styrene copolymer rubber, applying the resulting composition to the entire interior surface of a tire casing from one bead area thereof to the other, said tire casing having a carcass comprising cord fabric coated with a rubber selected from the group consisting of natural rubber and butadiene-styrene copolymer, and thereafter vulcanizing the assembly in tire shape.

5. A method of making a tubeless tire comprising in combination the steps of chemically modifying a rubbery copolymer of an isoolefin having from 4 to 6 carbon atoms with from 0.5 to 5% of a conjugated diolefin having from 4 to 8 carbon atoms by masticating 100 parts of said rubbery copolymer with from 0.15 to 0.6 part of paraquinone dioxime for from 3 minutes at 400° F. to 60 minutes at 300° F., to provide an essentially unvulcanized, processible, unsaturated, sheet-forming reaction product, mixing from 45 to 75% by weight of the thus-modified copolymer with correspondingly from 55 to 25% of a rubber selected from the group consisting of natural rubber and butadiene-styrene copolymer rubber, applying the resulting composition to the entire interior surface of a tire casing from one bead area thereof to the other, said tire casing having a carcass comprising cord fabric coated with a rubber selected from the group consisting of natural rubber and butadiene-styrene copolymer, and thereafter vulcanizing the assembly in tire shape.

6. A method of making a tubeless tire comprising in combination the steps of chemically modifying a rubbery copolymer of an isoolefin having from 4 to 6 carbon atoms with from 0.5 to 5% of a conjugated diolefin having from 4 to 8 carbon atoms by masticating 100 parts of said rubbery copolymer with from 0.15 to 0.6 part of paraquinone dioxime for from 10–20 minutes at 350–375° F., to provide an essentially unvulcanized, processible, unsaturated, sheet-forming reaction product, mixing from 45 to 75% by weight of the thus-modified copolymer with correspondingly from 55 to 25% of a rubber selected from the group consisting of natural rubber and butadiene-styrene copolymer rubber, applying the resulting composition to the entire interior surface of a tire casing from one bead area thereof to the other, said tire casing having a carcass comprising cord fabric coated with a rubber selected from the group consisting of natural rubber and butadiene-styrene copolymer, and thereafter vulcanizing the assembly in tire shape.

7. A method of making a tubeless tire comprising in combination the steps of chemically modifying a rubbery copolymer of isobutylene with from 0.5 to 5% of isoprene by masticating 100 parts of said rubbery copolymer with from 0.15 to 0.6 part of paraquinone dioxime for 10–20 minutes at 350–375° F., to provide an essentially unvulcanized, processsible, unsaturated, sheet-forming reaction product, mixing from 45 to 75% by weight of the thus-modified copolymer with correspondingly from 55 to 25% of natural rubber, applying the resulting composition to the entire interior surface of a tire casing from one bead area thereof to the other, said tire casing having a carcass comprising cord fabric coated with natural rubber, and thereafter vulcanizing the assembly in tire shape.

References Cited in the file of this patent

UNITED STATES PATENTS

| | | |
|---|---|---|
| 2,548,505 | Turner et al. | Apr. 10, 1951 |
| 2,557,641 | Dudley | June 19, 1951 |
| 2,557,642 | Dudley | June 19, 1951 |
| 2,566,329 | Hessney et al. | Sept. 4, 1951 |
| 2,566,384 | Tilton | Sept. 4, 1951 |
| 2,676,636 | Sarbach | Apr. 27, 1954 |